(12) United States Patent
Shin et al.

(10) Patent No.: US 6,330,439 B1
(45) Date of Patent: Dec. 11, 2001

(54) METHOD FOR PREDICTING RADIO-WAVE PROPAGATION LOSSES BY USING IMPROVED INTERPOLATION SCHEME IN RADIO NETWORK PLANNING SYSTEM

(75) Inventors: Young-Hee Shin; Hyun-Meen Jung, both of Seoul (KR)

(73) Assignee: Korea Telecom, Sungnam-shi (KR)

( * ) Notice: Subject to any disclaimer, the term of this patent is extended or adjusted under 35 U.S.C. 154(b) by 0 days.

(21) Appl. No.: 09/438,415

(22) Filed: Nov. 12, 1999

(30) Foreign Application Priority Data

Nov. 12, 1998 (KR) ................................. 98-48476

(51) Int. Cl.[7] .............................. H04B 17/00; H04Q 7/20
(52) U.S. Cl. ......................... 455/423; 455/446; 455/67.1
(58) Field of Search ................................. 455/446, 447, 455/423, 67.1, 67.6, 561; 345/426, 428, 429, 432, 130

(56) References Cited

U.S. PATENT DOCUMENTS

| | | | |
|---|---|---|---|
| 5,301,127 | * 4/1994 | Hitney | 364/525 |
| 5,579,053 | * 11/1996 | Pandel | 348/448 |
| 5,878,328 | * 3/1999 | Chawla et al. | 455/67.1 |
| 6,108,011 | * 8/2000 | Fowler | 345/441 |

* cited by examiner

*Primary Examiner*—Vivian Chang
*Assistant Examiner*—Duc Nguyen
(74) *Attorney, Agent, or Firm*—Staas & Halsey LLP

(57) ABSTRACT

A method for predicting radio-wave propagation loss values of points located in a service area of a base station, includes the steps of: (a) calculating radio-wave propagation loss values of points located along with initial and next radial lines based on parameters defined by a user; (b) designating one of initial missed points as a target point; (c) searching first and second mapping points; (d) calculating radio-wave propagation loss values of the first and second mapping points; (e) calculating radio-wave propagation loss value of the target point by using the radio-wave propagation loss values of the first and second mapping points; (f) designating another initial missed point as the target point and repeating said steps (c) to (f) until radio-wave propagation loss values for all the initial missed points are calculated; and (g) designating the next radial line as an initial line and repeating said steps (a) to (g) to calculate the radio-wave propagation loss values of the radial points located on the radial lines and the missed points out of the radial lines.

22 Claims, 4 Drawing Sheets

X : POINT MISSED OUT OF THE RADIAL LINE RL1 AND RL2

X : POINT ON WHICH IS CALCULATED A RADIO-WAVE PROPAGATION LOSS VALUE

X : POINT MISSED OUT OF THE RADIAL LINE RL1 AND RL2

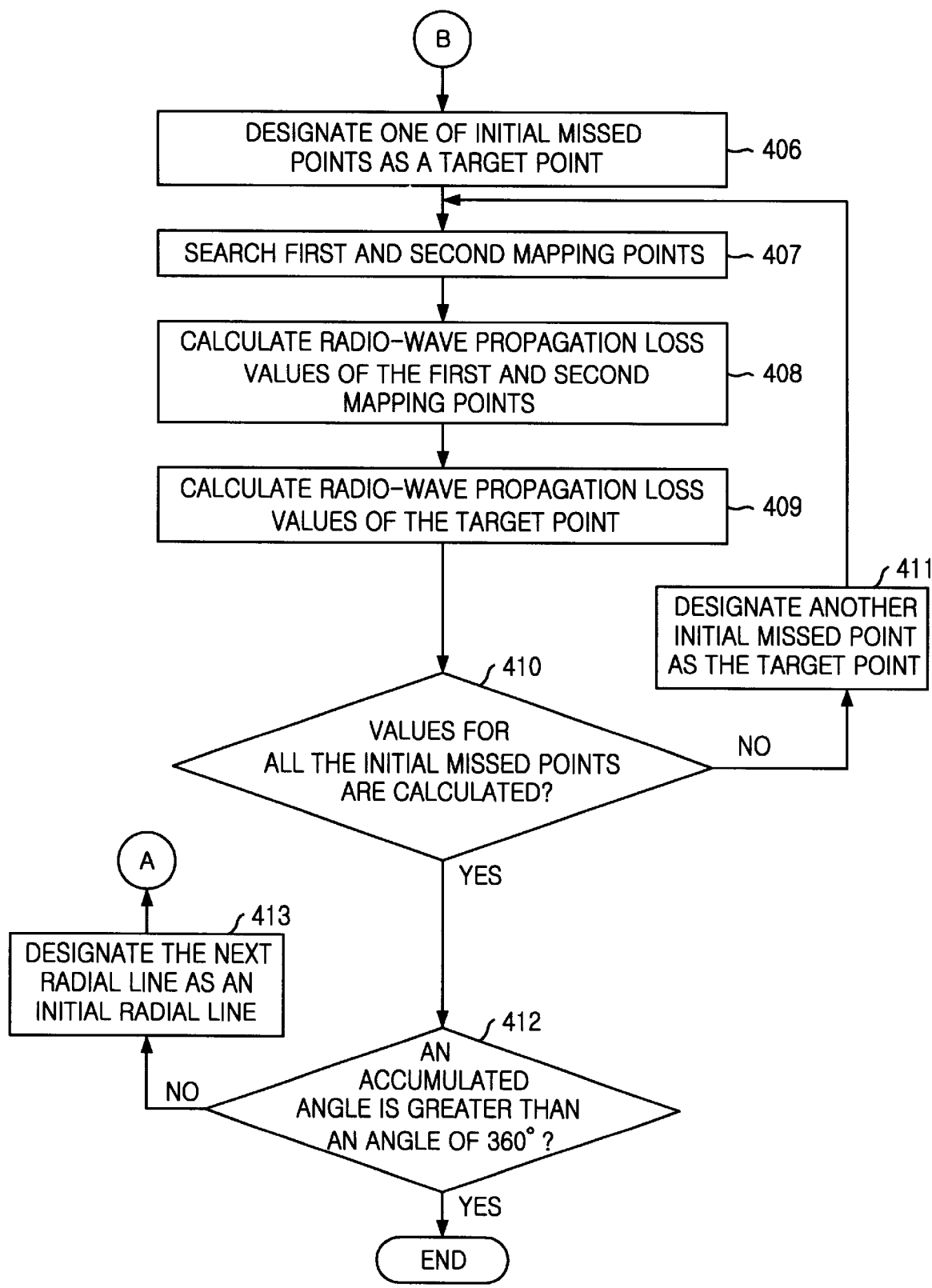

METHOD FOR PREDICTING RADIO-WAVE PROPAGATION LOSSES BY USING IMPROVED INTERPOLATION SCHEME IN RADIO NETWORK PLANNING SYSTEM

FIELD OF THE INVENTION

The present invention relates to a method for predicting radio-wave propagation loss as in a radio network planning system; and, more particularly, to a method for predicting radio-wave propagation loss values of points located along radial lines of a cell grid map and points missed out of the radial lines by using an improved interpolation scheme.

DESCRIPTION OF THE PRIOR ART

Generally, a radio network planning system determines a cell coverage of a base station in order to predict radio-wave propagation losses and plan a radio network. The term "cell coverage" means a service area of the base station. As a radio wave signal is far from the base station transmitting the radio wave signal to a terminal, the intensity of the radio wave signal becomes gradually weaken. When the intensity of the radio wave signal is less than a predetermined intensity, a communication between mobile and base stations becomes impossible. Further, in case where the terrain, nature features on the earth and so on influence the radio wave signal, the shape of the cell coverage is irregular on the cell grid map. To predict the cell coverage of the base station, a radio network planning system may calculate radio-wave propagation loss values by using a mathematical model and geographic information A conventional radio-wave propagation prediction engine of the radio network planning system calculates the radio-wave propagation loss values from the origin of the base station to the predetermined radius and stores data representing the calculated radio-wave propagation losses.

The radio-wave propagation prediction engine reads parameters related to a predetermined radius and a form of data of the radio-wave propagation losses. Then, the radio-wave propagation prediction engine calls the mathematical model to calculate the radio-wave propagation losses. The radio-wave propagation prediction engine stores data of the calculated radio-wave propagation losses according to the data form. Typically, information of a grid form as a radio-wave propagation prediction result is stored in the radio network planning system, wherein the information of the grid form may satisfy a given resolution.

An algorithm for predicting the radio-wave propagation losses is implemented in a conventional radio network planning system. The algorithm performs a radio-wave propagation loss prediction of points located along with a plurality of radial lines of a cell grid map while increasing an angle of a radial line. The radial lines are extended from the base station to a point of a circumference in the cell grid map, respectively. The radio network planning system converts data of a spherical coordinate to data of a rectangular coordinate in order to save the calculated values. At this time, some points may be missed out of the radial lines of the cell grid map and in the calculation of radio-wave propagation losses. For the sake of reducing the number of the missed points, the number of the radial lines should be increased in the cell grid map.

When the number of radial lines is increased in the cell grid map, there is a problem that the number of calculations should be increased. Although an interpolation scheme has been employed to reduce the number of calculations, there is a problem that the conventional interpolation scheme can not effectively reduce the number of calculations according to data randomly defined by a user.

SUMMARY OF THE INVENTION

It is, therefore, an object of the present invention to provide a method for predicting radio-wave propagation loss values of points located along radial lines of a cell grid map and points missed out of the radial lines that is capable of controlling the number of calculations according to data defined by a user and improving the accuracy of the radio-wave propagation loss prediction by using an improved interpolation scheme.

It is, therefore, another object of the present invention to provide a computer-readable medium that performs a method for predicting radio-wave propagation losses of points located along radial lines of a cell grid map and points missed out of the radial lines by using an improved interpolation scheme.

In accordance with one aspect of the present invention, there is provided a method for predicting radio-wave propagation loss values of points located in a service area of a base station, wherein the service area is represented by a circle about the base station mapped into a cell grid map and wherein the points includes radial points located on radial lines and missed points out of the radial lines, comprising the steps of: (a) calculating radio-wave propagation loss values of points located along with initial and next radial lines based on parameters defined by a user; (b) designating one of initial missed points as a target point, wherein the initial missed points are located within a region of the cell grid map defined by the initial and next radial lines and a circumference of the circle connected between the initial and next radial lines; (c) searching first and second mapping points, wherein the first mapping point is located on an intersection point of a perpendicular line and the initial radial line and the second mapping point is located on an intersection point of a perpendicular line and the next radial line; (d) calculating radio-wave propagation loss values of the first and second mapping points; (e) calculating radio-wave propagation loss value of the target point by using the radio-wave propagation loss values of the first and second mapping points; (f) designating another initial missed point as the target point and repeating said steps (c) to (f) until radio-wave propagation loss values for all the initial missed points are calculated; and (g) designating the next radial line as an initial line and repeating said steps (a) to (g) to calculate the radio-wave propagation loss values of the radial points located on the radial lines and the missed points out of the radial lines.

In accordance with another aspect of the present invention, there is provided a computer-readable medium for predicting radio-wave propagation loss values of points located in a service area of a base station, wherein the service area is represented by a circle about the base station mapped into a cell grid map and wherein the points includes radial points located on radial lines and missed points out of the radial lines, comprising the steps of: (a) calculating radio wave propagation loss values of points located along with initial and next radial lines based on parameters defined by a user; (b) designating one of initial missed points as a target point, wherein the initial missed points are located within a region of the cell grid map defined by the initial and next radial lines and a circumference of the circle connected between the initial and next radial lines; (c) searching first and second mapping points, wherein the first mapping point is located on an intersection point of a perpendicular line and the initial radial line and the second mapping point is located on an intersection point of a perpendicular line and the next radial line; (d) calculating radio-wave propagation loss values of the first and second mapping points; (e) calculating radio-wave propagation loss value of the target point by using the radio-wave propagation loss values of the first and second mapping points; (f) designating another initial missed point as the target point and repeating said steps (c) to (f) until radio-wave propagation loss values for all the initial missed points are calculated; and (g) designating the next radial line as an initial line and repeating said steps (a) to (g) to calculate the radio-wave propagation loss values of the radial points located on the radial lines and the missed points out of the radial lines.

BRIEF DESCRIPTION OF THE DRAWINGS

The above and other objects and features of the instant invention will become apparent from the following description of preferred embodiments taken in conjunction with the accompanying drawings, in which:

FIGS. 4A and 4B are a flow chart depicting a method for predicting radio-wave propagation losses in accordance with the present invention.

DETAILED DESCRIPTION OF THE INVENTION

Figure 1:
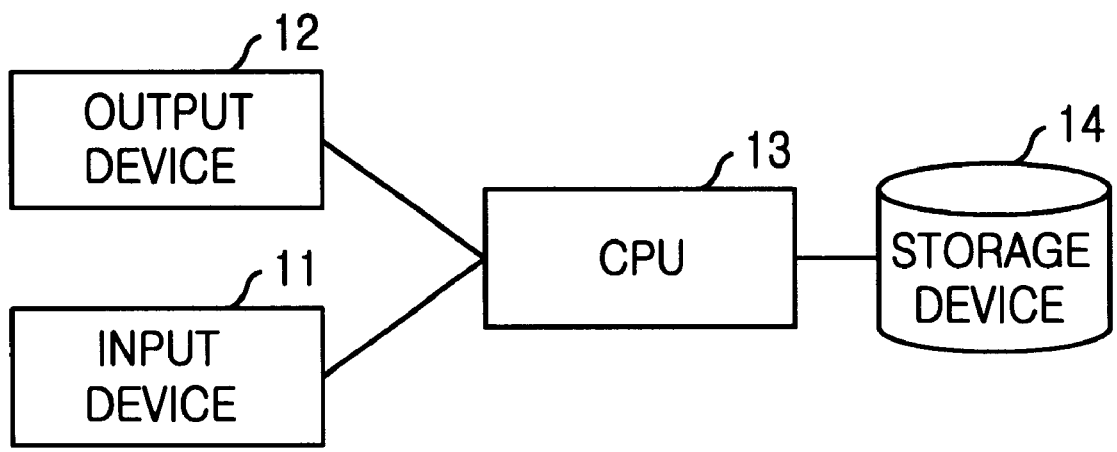
FIG. 1 is a block diagram describing a radio network planning system to which the present invention is applicable.

Referring to FIG. 1, radio network planning system includes an input device 11, an output device 12, a central processing unit (CPU) 13 and a storage device 14. The input device 11, e.g., a keyboard, a mouse and so on, receives data needed to predict radio-wave propagation loss values from a user, wherein the data is defined by the user. The storage device 14 stores data related to geographic information. The central processing unit 13 predicts the radio-wave propagation loss values by using the data related to the geographic information from the storage device 14 and the data defined by the user from the input device 11. The output device 12, e.g., a computer monitor, a display and so on, displays the radio-wave propagation loss values predicted by the central processing unit 13.

Figure 2:
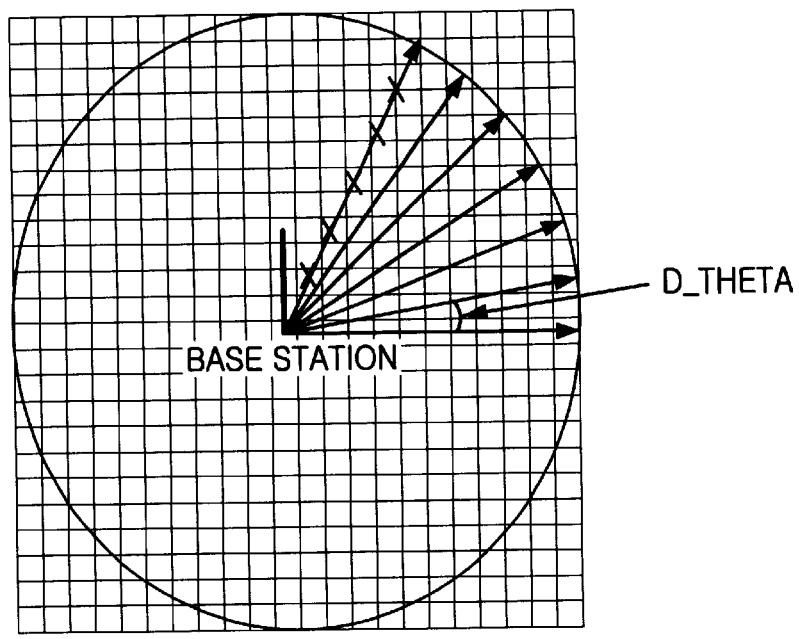
FIG. 2 is a cell grid map showing radial lines and points located along with the radial lines.

Referring to FIG. 2, there is shown a cell grid map defined by a radius of a circle, a length between grid points, a plurality of radial lines and a plurality of points located along with the radial lines.

The number of radial lines is determined by an angle D_THETA, wherein the angle D_THETA described as:

$$D\_THETA = (ALPHA) \times ((\text{the length between grid points})/(\text{the radius R of the circle})) \quad \text{Eq. 1}$$

where ALPHA is a weight defined by a user.

Also, the number of points located along with one radial line is determined by a length D_LENGTH, wherein the length D_LENGTH is described as:

$$D\_LENGTH = (\text{the radius of the circle})/(\text{the number of the points located along with the one radial line}) \quad \text{Eq. 2}$$

Figure 3:
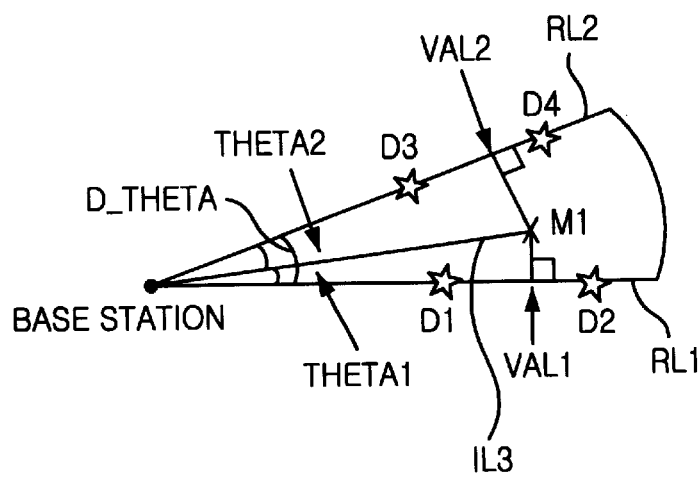
FIG. 3 is an explanatory view illustrative of calculating radio-wave propagation loss values of points missed out of radial lines in accordance with the present invention.

Referring to FIGS. 2 and 3, there is shown a region of the cell grid map defined by two radial lines RL1 and RL2 and a circumference between the two radial lines RL1 and RL2. A point M1 missed out of the two radial lines RL1 and RL2 exists within the region of the cell grid map.

Four points D1, D2, D3 and D4 located on two radial lines R1 and R2 are adjacent and closest to the point M1. A mapping point VAL1 exists between the points D1 and D2 located along with the radial line RL1. A perpendicular line connected between the mapping point VAL1 and the point M1 is perpendicular to the radial line RL1.

A mapping point VAL2 exists between the points D3 and D4 located along with the radial line RL2. A perpendicular line connected between the mapping point VAL2 and the point M1 is perpendicular to the radial line RL2. An angle between the radial line RL1 and a line IL3 is represented by an angle THETA1 and an angle between the radial line RL2 and the line IL3 is designated by an angle THETA2.

The radio-wave propagation loss value LOSS1 of the mapping point VAL1 is determined by:

$$LOSS1 = \{(((\text{a length between the mapping point VAL1 and the point D1}) \times (\text{the radio-wave propagation loss value of the point D1})) + ((\text{a length between the mapping point VAL1 and the point D2}) \times (\text{the radio-wave propagation loss value of the point D2})))/\text{the length D\_LENGTH}\} \quad \text{Eq. 3}$$

Further, the radio-wave propagation loss value LOSS2 of the mapping point VAL2 is determined by:

$$LOSS2 = \{(((\text{a length between the mapping point VAL2 and the point D3}) \times (\text{the radio-wave propagation loss value of the point D3})) + ((\text{a length between mapping point VAL2 and the point D4}) \times (\text{the radio-wave propagation loss value of the point D4})))/\text{the length D\_LENGTH}\} \quad \text{Eq. 4}$$

Furthermore, the radio-wave propagation loss value LOSS of the point M1 is determine by:

$$LOSS = \{(((\text{the radio-wave propagation loss value LOSS1}) \times (\text{the angle THETA2})) + ((\text{the radio-wave propagation loss value LOSS2}) \times (\text{the angle THETA1})))/\text{the angle D\_THETA}\} \quad \text{Eq. 5}$$

Figure 4A:
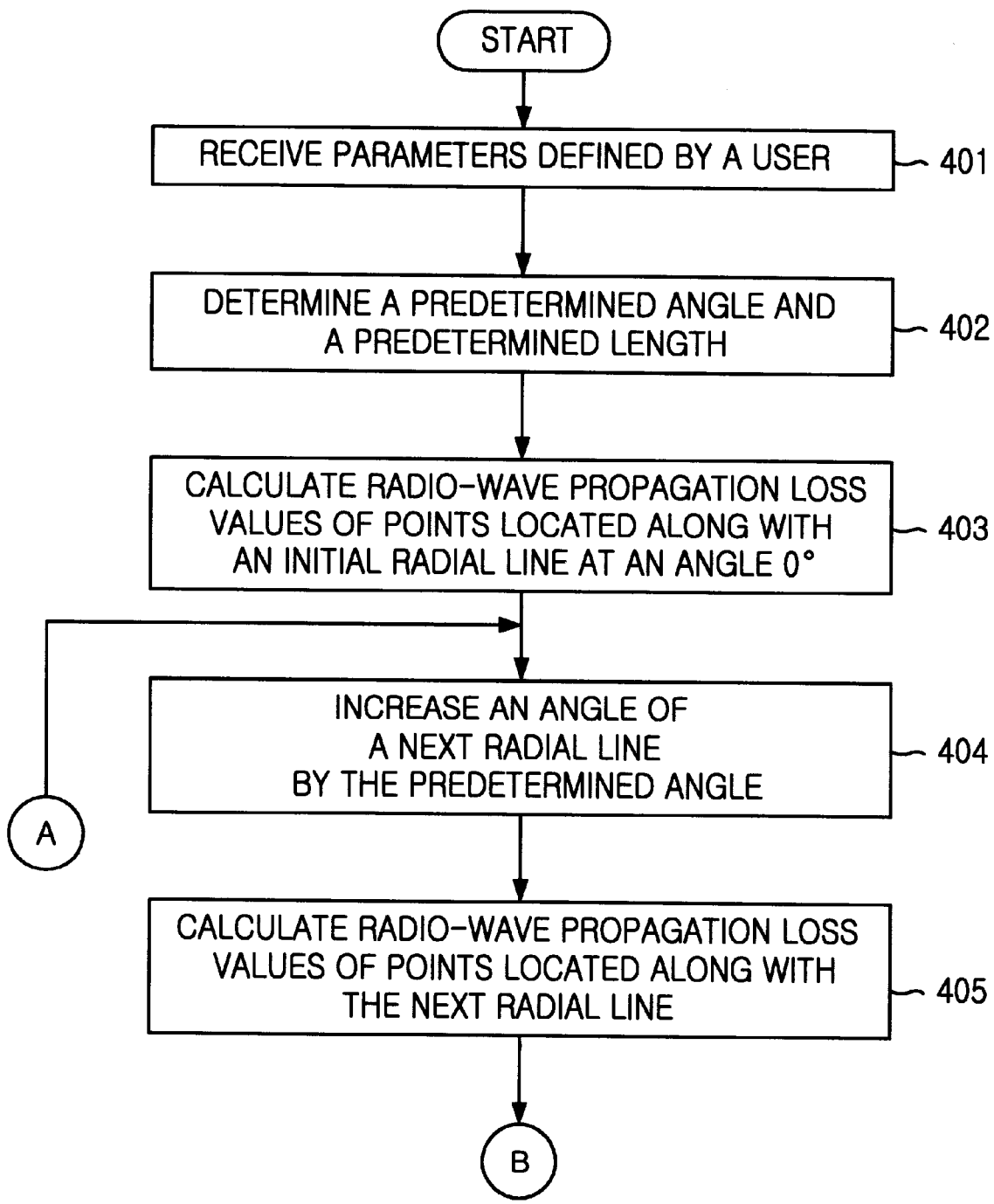

Referring to FIGS. 4A and 4B, there is shown a flow chart 400 depicting a method for predicting radio-wave propagation loss values of points located in a service area of a base station, wherein the service area is represented by a circle about the base station mapped into a cell grid map and wherein the points includes radial points located on radial lines and missed points out of the radial lines.

At step 401, parameters related to a radius of a circle of the cell grid map, a length between grid points of the cell grid map and the number of points located along with one radial line are received from a user. The parameters are defined by the user.

At step 402, a predetermined angle between the radial lines and a predetermined length between the points located along with the radial lines are determined from the parameters.

The predetermined angle is determined by:

D_THETA=(ALPHA)×((the length between the grid points)/(the radius of the circle)), ALPHA being a weight defined by the user and D_THETA being the predetermined angle.

The predetermined length is determined by:

D_LENGTH=(the radius of the circle)/(the number of points located along with one radial line), D_LENGTH being the predetermined length.

At step 403, radio-wave propagation loss values of points located along with an initial radial line at an angle 0° is calculated.

At step 404, an angle of a next radial line is increased by the predetermined angle.

At step 405, radio-wave propagation loss values of points located along with the next radial line are calculated.

At step 406, one of initial missed points as a target point is designated, wherein the initial missed points are located within a region of the cell grid map defined by the initial and next radial lines and a circumference of the circle connected between the initial and next radial lines.

At step 407, first and second mapping points are searched, wherein the first mapping point is located on an intersection point of a perpendicular line an the initial radial line and the second mapping point is located on an intersection point of a perpendicular line and the next radial line.

At step 408, radio-wave propagation loss values of the first and second mapping points are calculated.

The initial radial line includes first and second points adjacent to the target point and the first mapping point is located between the first and second points. The radio-wave propagation loss value of the first mapping point is determined by:

LOSS1={((((a length between the first mapping point and the first point)×(a radio-wave propagation loss value of the first point))+((a length between the first mapping point and the second point)×(a radio-wave propagation loss value of the second point)))/the length D_LENGTH}, LOSS1 being the radio-wave propagation loss value of the first mapping point.

The next radial line includes third and fourth points adjacent to the target point and the second mapping point is located between the third and fourth points. The radio-wave propagation loss value of the second mapping point is determined by:

LOSS2={((((a length between the second mapping point and the third point)×(a radio-wave propagation loss value of the third point))+((a length between the second mapping point and the fourth point)×(a radio-wave propagation loss value of the fourth point)))/the length D_LENGTH}, LOSS2 being the radio-wave propagation loss value of the second mapping point.

At step 409, radio-wave propagation loss value of the target point is calculated by using the radio-wave propagation loss values of the first and second mapping points. The radio-wave propagation loss value of the target point is determined by:

LOSS={((((the radio-wave propagation loss value LOSS1)×(an angle THETA2))+((the radio-wave propagation loss value LOSS2)×(an angle THETA1)))/the angle D_THETA}, LOSS being the radio-wave propagation loss value of the target point, the angle THETA2 being an angle between the next radial line and a line connected between the origin of the circle and the target point and the angle THETA1 being an angle between the initial radial line and a line connected between the origin of the circle and the target point.

At step 410, it is determined whether radio-wave propagation loss values for all the initial missed points are calculated.

At step 411, if the radio-wave propagation loss values for all the initial missed points have been not calculated, another initial missed point is designated as the target point. Then, the steps of 407 to 411 are repeated until the radio-wave propagation loss values for all the initial missed points have been not calculated.

At step 412, if the radio-wave propagation loss values for all the initial missed points have been calculated, it is determined whether an accumulated angle is greater than an angle of 360°.

At step 413, if the accumulated angle is not greater than an angle of 360°, the next radial line is designated as an initial line. Then, the steps 404 to 413 are repeated until the radio-wave propagation loss values of the radial points located on the radial lines and the missed point out of the radial lines are calculated.

The method for predicting the radio-wave propagation losses is preferably implemented in the radio network planning system. The method for predicting the radio-wave propagation loss can be stored in a computer-readable medium, e.g., an optical disk, a hard disk and so on.

Although the preferred embodiments of the invention have been disclosed for illustrative purposes, those skilled in the art will appreciate that various modifications, additions and substitutions are possible, without departing from the scope and spirit of the invention a disclosed in the accompanying claims.

What is claimed is:

1. A method for predicting radio-wave propagation loss values of points located in a service area of a base station, wherein the service area is represented by a circle about the base station mapped into a cell grid map and wherein the points includes radial points located on radial lines and missed points out of the radial lines, comprising the step of:

(a) calculating radio-wave propagation loss values of points located along with initial and next radial lines based on parameters defined by a user;

(b) designating one of initial missed points as a target point, wherein the initial missed points are located within a region of the cell grid map defined by the initial and next radial lines and a circumference of the circle connected between the initial and next radial lines;

(c) searching first and second mapping points, wherein the first mapping point is located on an intersection point of a perpendicular line and the initial radial line and the second mapping point is located on an intersection point of a perpendicular line and the next radial line;

(d) calculating radio-wave propagation loss values of the first and second mapping points;

(e) calculating radio-wave propagation loss value of the target point by using the radio-wave propagation loss values of the first and second mapping points;

(f) designating another initial missed point as the target point and repeating said steps (c) to (f) until radio-wave propagation loss values for all the initial missed points are calculated; and (g) designating the next radial line as an initial line and repeating said steps (a) to (g) to calculate the radio-wave propagation loss values of the radial points located on the radial lines and the missed points out of the radial lines.

2. The method as recited in claim 1, wherein the parameters contained in said step (a) are related to a radius of a circle of the cell grid map, a length between grid points of the cell grid map and the number of points located along with one radial line.

3. The method as recited in claim 2, wherein the said step (a) includes the steps of:

(a1) determining a predetermined angle between the radial lines and a predetermined length between the points located along with the radial lines from the parameters;

(a2) calculating radio-wave propagation loss values of points located along with the initial radial line;

(a3) increasing an angle of the next radial line by the predetermined angle; and (a4) calculating radio-wave propagation loss values of points located along with the next radial line.

4. The method as recited in claim 3, wherein the said step (g) includes the steps of:
   (g1) determining whether an accumulated angle is greater than an angle of 360°;
   (g2) repeating said steps (a) to (g) if the accumulated angle is not greater than the angle of 360°; and
   (g3) completing a procedure of the method if the accumulated angle is greater than the angle of 360°.

5. The method as recited in claim 4, wherein the predetermined angle contained in said (a1) is determined by:
   D_THETA=(ALPHA)×((the length between the grid points)/(the radius of the circle)), ALPHA being a weight defined by the user and D_THETA being the predetermined angle.

6. The method as recited in claim 5, wherein the predetermined length contained in said (a1) is determined by:
   D_LENGTH (the radius of the circle)/(the number of points located along with one radial line), D_LENGTH being the predetermined length.

7. The method as recited in claim 6, wherein the initial radial line contained in said step (a) includes first and second points adjacent to the target point and the first mapping point contained in said step (c) is located between the first and second points.

8. The method as recited in claim 7, wherein the radio-wave propagation loss value of the first mapping point in contained said step (d) is determined by:
   LOSS1={(((a length between the first mapping point and the first point)×(a radio-wave propagation loss value of the first point))+((a length between the first mapping point and the second point)×(a radio-wave propagation loss value of the second point)))/the length D_LENGTH}, LOSS1 being the radio-wave propagation loss value of the first mapping point.

9. The method as recited in claim 8, wherein the next radial line contained in said step (a) includes third and fourth points adjacent to the target point and the second mapping point contained in said step (c) is located between the third and fourth points.

10. The method as recited in claim 9, wherein the radio-wave propagation loss value of the second mapping point contained in said step (d) is determined by:
    LOSS2={(((a length between the second mapping point and the third point)×(a radio-wave propagation loss value of the third point))+((a length between the second mapping point and the fourth point)×(a radio-wave propagation loss value of the fourth point)))/the length D_LENGTH}, LOSS2 being the radio-wave propagation loss value of the second mapping point.

11. The method as recited in claim 10, wherein the radio-wave propagation loss value of the target point contained in said step (b) is determined by:
    LOSS={(((the radio-wave propagation loss value LOSS1)×(an angle THETA2))+((the radio-wave propagation loss value LOSS2)×(an angle THETA1)))/the angle D_THETA}, LOSS being the radio-wave propagation loss value of the target point, the angle THETA2 being an angle between the next radial line and a line connected between the origin of the circle and the target point and the angle THETA1 being an angle between the initial radial line and a line connected between the origin of the circle and the target point.

12. A computer-readable medium for predicting radio-wave propagation loss values of points located in a service area of a base station, wherein the service area is represented by a circle about the base station mapped into a cell grid map and wherein the points includes radial points located on radial lines and missed points out of the radial lines, comprising the steps of:
    (a) calculating radio-wave propagation loss values of points located along with initial and next radial lines based on parameters defined by a user;
    (b) designating one of initial missed points as a target point, wherein the initial missed points are located within a region of the cell grid map defined by the initial and next radial lines and a circumference of the circle connected between the initial and next radial lines;
    (c) searching first and second mapping points, wherein the first mapping point is located on an intersection point of a perpendicular line and the initial radial line and the second mapping point is located on an intersection point of a perpendicular line and the next radial line;
    (d) calculating radio-wave propagation loss values of the first and second mapping points;
    (e) calculating radio-wave propagation loss value of the target point by using the radio-wave propagation loss values of the first and second mapping points;
    (f) designating another initial missed point as the target point and repeating said steps (c) to (f) until radio-wave propagation loss values for all the initial missed points are calculated; and
    (g) designating the next radial line as an initial line and repeating said steps (a) to (g) to calculate the radio-wave propagation loss values of the radial points located on the radial lines and the missed points out of the radial lines.

13. The computer-readable medium as recited in claim 12, wherein the parameters contained in said step (a) are related to a radius of a circle of the cell grid map, a length between grid points of the cell grid map and the number of points located along with one radial line.

14. The computer-readable medium as recited in claim 13, wherein the said step (a) includes the steps of:
    (a1) determining a predetermined angle between the radial lines and a predetermined length between the points located along with the radial lines from the parameters;
    (a2) calculating radio-wave propagation loss values of points located along with the initial radial line;
    (a3) increasing an angle of the next radial line by the predetermined angle; and
    (a4) calculating radio-wave propagation loss values of points located along with the next radial line.

15. The computer-readable medium as recited in claim 14, wherein the said step (g) includes the steps of:
    (g1) determining whether an accumulated angle is greater than an angle of 360°;
    (g2) repeating said steps (a) to (g) if the accumulated angle is not greater than the angle of 360°; and
    (g3) completing a procedure of the method if the accumulated angle is greater than the angle of 360°.

16. The computer-readable medium as recited in claim 15, wherein the predetermined angle contained in said (a1) is determined by:
    D_THETA=(ALPHA)×((the length between the grid points)/(the radius of the circle)), ALPHA being a weight defined by the user and D_THETA being the predetermined angle.

17. The computer-readable medium as recited in claim 16, wherein the predetermined length contained in said (a1) is determined by:

D_LENGTH=(the radius of the circle)/(the number of points located along with one radial line), D_LENGTH being the predetermined length.

18. The computer-readable medium as recited in claim 17, wherein the initial radial line contained in said step (a) includes first and second points adjacent to the target point and the first mapping point contained in said step (c) is located between the first and second points.

19. The computer-readable medium as recited in claim 18, wherein the radio-wave propagation loss value of the first mapping point in contained said step (d) is determined by:

LOSS1={(((a length between the first mapping point and the first point)×(a radio-wave propagation loss value of the first point))+((a length between the first mapping point and the second point)×(a radio-wave propagation loss value of the second point) the length D LENGTH}, LOSS1 being the radio-wave propagation loss value of the first mapping point.

20. The computer-readable medium as recited in claim 19, wherein the next radial line contained in said step (a) includes third and fourth points adjacent to the target point and the second mapping point contained in said step (c) is located between the third and fourth points.

21. The computer-readable medium as recited in claim 20, wherein the radio-wave propagation loss value of the second mapping point contained in said step (d) is determined by:

LOSS2={(((a length between the second mapping point and the third point)×(a radio-wave propagation loss value of the third point))+((a length between the second mapping point and the fourth point)×(a radio-wave propagation loss value of the fourth point)))/the length D_LENGTH}, LOSS2 being the radio-wave propagation loss value of the second mapping point.

22. The computer-readable medium as recited in claim 21, wherein the radio-wave propagation loss value of the target point contained in said step (b) is determined by:

LOSS={(((the radio-wave propagation loss value LOSS1)×(an angle THETA2))+((the radio-wave propagation loss value LOSS2)×(an angle THETA1)))/the angle D_THETA}, LOSS being the radio-wave propagation loss value of the target point, the angle THETA2 being an angle between the next radial line and a line connected between the origin of the circle and the target point and the angle THETA1 being an angle between the initial radial line and a line connected between the origin of the circle and the target point.

* * * * *